(12) United States Patent
Kim

(10) Patent No.: US 8,802,275 B2
(45) Date of Patent: Aug. 12, 2014

(54) BATTERY MODULE

(75) Inventor: Dukjung Kim, Yongin (KR)

(73) Assignees: Samsung SDI Co., Ltd., Yongin-si, Gyeonggi-do (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/531,877

(22) Filed: Jun. 25, 2012

(65) Prior Publication Data

US 2013/0224564 A1 Aug. 29, 2013

Related U.S. Application Data

(60) Provisional application No. 61/602,315, filed on Feb. 23, 2012.

(51) Int. Cl.
*H01M 2/24* (2006.01)

(52) U.S. Cl.
USPC .......................................................... 429/158

(58) Field of Classification Search
CPC ....................................................... H01M 2/24
USPC .................... 429/149–160; 324/433; 320/116
See application file for complete search history.

(56) References Cited

U.S. PATENT DOCUMENTS

| | | | |
|---|---|---|---|
| 2007/0132429 A1* | 6/2007 | Onuki et al. | 320/116 |
| 2011/0159353 A1 | 6/2011 | Byun et al. | |
| 2011/0177379 A1 | 7/2011 | Maguire | |
| 2011/0256445 A1* | 10/2011 | Kim et al. | 429/158 |
| 2012/0038365 A1 | 2/2012 | Nagata et al. | |
| 2012/0115015 A1* | 5/2012 | Park et al. | 429/159 |
| 2013/0130081 A1 | 5/2013 | Diez et al. | |

FOREIGN PATENT DOCUMENTS

| | | |
|---|---|---|
| DE | 10 2010-03138 A1 | 1/2012 |
| JP | 2010-257686 A | 11/2010 |
| JP | 2010-267444 A | 11/2010 |
| KR | 10-2011-0076738 A | 7/2011 |

OTHER PUBLICATIONS

European Search Report in 12175789.2-1359, dated Jun. 6, 2013 (KIM).

* cited by examiner

*Primary Examiner* — Patrick Ryan
*Assistant Examiner* — Kiran Quraishi
(74) *Attorney, Agent, or Firm* — Lee & Morse, P.C.

(57) ABSTRACT

A battery module includes a plurality of unit cells, each unit cell having a first terminal and a second terminal, the plurality of unit cells including at least a first unit cell and a second unit cell, and a bus bar electrically connecting the first terminal of the first unit cell to one of the first and second terminals of the second unit cell, the bus bar including an insertion part therein, the insertion part being configured to receive a sensing member and connect the sensing member to the bus bar.

16 Claims, 10 Drawing Sheets

BATTERY MODULE

CROSS-REFERENCE TO RELATED APPLICATION

The present application claims priority under 35 U.S.C. §119(e) to U.S. Provisional Application No. 61/602,315, filed on Feb. 23, 2012, and entitled: "Battery Module," which is incorporated herein by reference in its entirety.

BACKGROUND

1. Field

Embodiments relate to a battery module.

2. Description of the Related Art

A secondary battery module may include a plurality of unit cells connected in series or parallel. Each of the unit cells may be formed by accommodating an electrode assembly having a separator, as an insulator, disposed between positive and negative electrode plates. Each of the unit cells may include an electrolyte in a case, and an opening of the case may be sealed by a cap assembly, the cap assembly having respective electrode terminals coupled to the electrode plates.

SUMMARY

Embodiments are directed to a battery module, including a plurality of unit cells, each unit cell having a first terminal and a second terminal, the plurality of unit cells including at least a first unit cell and a second unit cell, and a bus bar electrically connecting the first terminal of the first unit cell to one of the first and second terminals of the second unit cell, the bus bar including an insertion part therein, the insertion part being configured to receive a sensing member and connect the sensing member to the bus bar.

The insertion part may be a groove or through hole.

The bus bar may have long sides extending between the first terminal of the first unit cell and the one of the first and second terminals of the second unit cell, and the insertion part may be a groove or through hole extending between the long sides.

The bus bar may be fixed to the first terminal of the first unit cell and fixed to the one of the first and second terminals of the second unit cell, the bus bar having respective fixing areas where the bus bar is fixed to first terminal of the first unit cell and fixed to the one of the first and second terminals of the second unit cell, and the insertion part may be spaced apart from each of the respective fixing areas.

Embodiments are also directed to a battery module, including a plurality of unit cells each having a first terminal and a second terminal, the plurality of unit cells including at least a first unit cell and a second unit cell, a bus bar electrically connecting the first terminal of the first unit cell to one of the first and second terminals of the second unit cell, the bus bar including an insertion part therein, and a sensing member, the sensing member being disposed in the insertion part and being connected to the bus bar.

The sensing member may be connected to the bus bar by a press-fit connection.

The press-fit connection may provide an electrical connection between the sensing member and the bus bar.

The sensing member may include a detection part, the detection part being inserted into the insertion part and having a press-fit with an inside wall of the insertion part.

The insertion part may include a recess in the inside wall thereof, the recess being configured to receive the detection part.

The insertion part may be a groove or through hole.

The sensing member may include an elastic detection part, the detection part being configured to be pressed from an undeformed state to a pressed state and inserted into the insertion part, the detection part having a width in the undeformed state that is larger than a width of the insertion part.

The sensing member may include a detection part that is shaped as an ellipse, a circle, or a polygon.

The sensing member may include a detection part that is shaped as an ellipse, a long dimension of the ellipse being greater than a width of the insertion part, the long dimension of the ellipse being pressed by walls of the insertion part when the detection part is inserted in the insertion part.

The sensing member may include a detection part that is shaped as an ellipse, a short dimension of the ellipse being greater than a width of the insertion part, the short dimension of the ellipse being pressed by walls of the insertion part when the detection part is inserted in the insertion part.

The sensing member may include a detection part that is shaped as a triangle, a leg of the triangle having a length that is greater than a width of the insertion part, the leg of the triangle being pressed by walls of the insertion part when the detection part is inserted in the insertion part.

The bus bar may have long sides extending between the first terminal of the first unit cell and the one of the first and second terminals of the second unit cell, the insertion part may be a groove or through hole extending between the long sides, and an insertion direction of the sensing member may be substantially perpendicular to one of the long sides.

The bus bar may have long sides extending between the first terminal of the first unit cell and the one of the first and second terminals of the second unit cell, opposing upper and lower major surfaces of the bus bar extending between the long sides, and the insertion part may be a through hole penetrating the upper and lower major surfaces of the bus bar.

The bus bar may have long sides extending between the first terminal of the first unit cell and the one of the first and second terminals of the second unit cell, opposing upper and lower major surfaces of the bus bar extending between the long sides, the insertion part may penetrate the upper major surface of the bus bar, the sensing member being inserted into the insertion part where the insertion part penetrates the upper major surface, and the bus bar may include an extension part at the lower major surface, the extension part being aligned with the insertion part.

The battery module may further include a battery management system configured to monitor a state of the battery module, the battery management system receiving a signal from the sensing member.

The sensing member may be removably coupled to the bus bar.

BRIEF DESCRIPTION OF THE DRAWINGS

Features will become apparent to those of skill in the art by describing in detail example embodiments with reference to the attached drawings in which:

FIG. 3b illustrates a cross-sectional view, taken along the line A-A' of FIG. 3a;

FIG. 7a illustrates a perspective view of another example embodiment of the bus bar shown in FIG. 3a;

FIG. 7b illustrates a cross-sectional view, taken along the line C-C' of FIG. 7a;

FIGS. 8a and 8b illustrate cross-sectional views where a sensing member is coupled to a bus bar, taken along the line C-C' of FIG. 7a;

FIG. 9a illustrates a perspective view of still another example embodiment of the bus bar shown in FIG. 3a;

FIG. 9b illustrates a cross-sectional view, taken along the line D-D' of FIG. 9a;

FIGS. 10a and 10b illustrate cross-sectional views where a sensing member is coupled to a bus bar, taken along the line D-D' of FIG. 9a;

DETAILED DESCRIPTION

Figure 1:
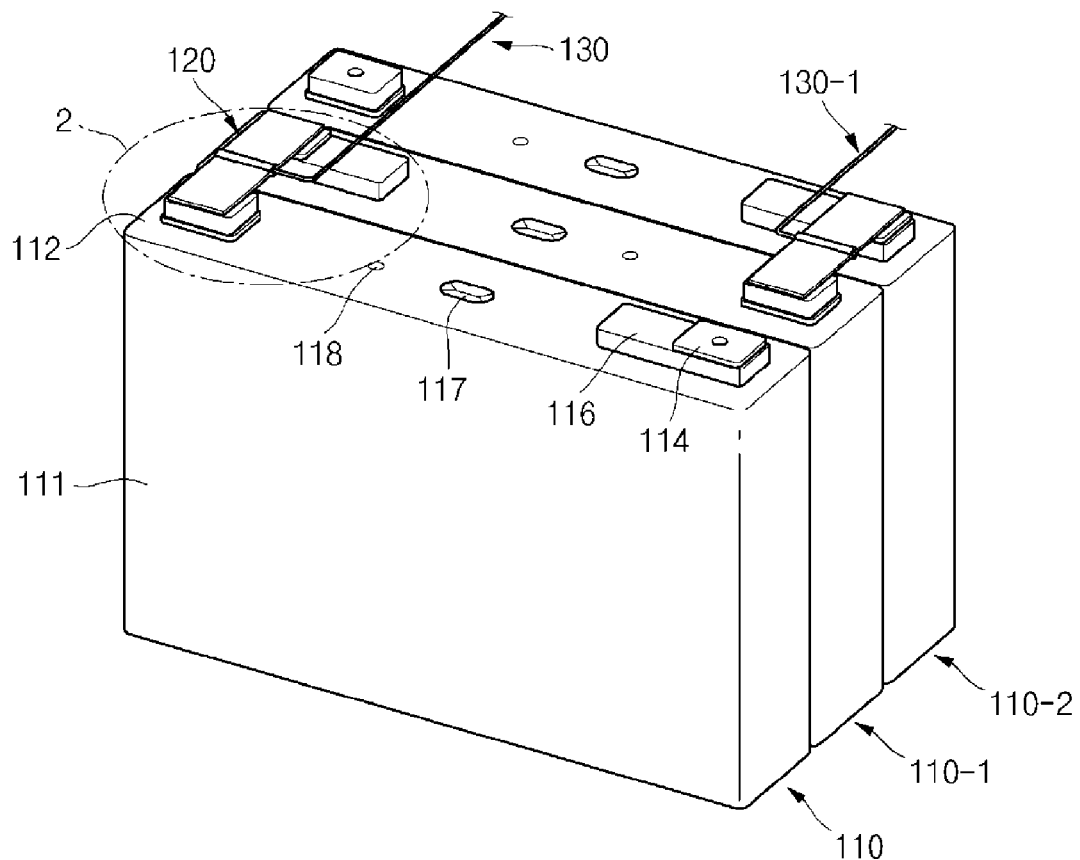
FIG. 1 illustrates a perspective view of a secondary battery module according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout FIG. 1 illustrates a perspective view of a secondary battery module according to an example embodiment and FIG. 2 illustrates a perspective view of a state in which a sensing member is separated from a region 2 shown in FIG. 1.

Figure 2:
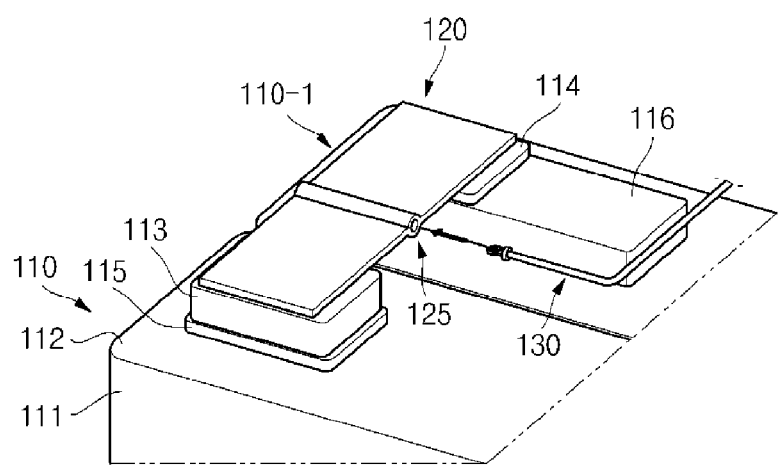
FIG. 2 illustrates a perspective view of a state in which a sensing member is separated from a region 2 shown in FIG. 1.

In the example embodiment shown in FIGS. 1 and 2, a secondary battery module 100 includes unit cells 110 (e.g., unit cells 110, 110-1, 110-2, etc.) and at least one bus bar 120. A sensing member 130 may be connected to the bus bar 120 and to a controller 140.

The secondary battery module may be formed by connecting unit cells (e.g., two unit cells of the unit cells 110, 110-1, and 110-2) to each other (in series or parallel) using the bus bar 120.

Each of the unit cells 110 may include a case 111 having an opening formed at one side thereof, a cap plate 112 coupled to the opening of the case 111, and first and second electrode terminals 113 and 114 protruding to the outside of the cap plate 112. The unit cells 110 may be battery cells having, e.g., prismatic, cylindrical, pouch, or other shapes. In the present example embodiment, the unit cells 110 are prismatic battery cells.

The cap plate 112 may include a first sealing member 115, a second sealing member 116, a safety vent 117, and a plug 118.

The first sealing member 115 may seal a portion between the cap plate 112 and the first electrode terminal 113. The first sealing member 115 may be formed of, e.g., a gasket to insulate the cap plate 112 and the first electrode terminal 113 from each other. In another implementation, the first sealing member 115 may be formed of a conductive connection plate to electrically connect the cap plate 112 to the first electrode terminal 113.

The second sealing member 116 may seal a portion between the cap plate 112 and the second electrode terminal 114. The second sealing member 116 may be formed of, e.g., an insulating member to insulate the cap plate 112 from the second electrode terminal 114.

The safety vent 117 may be configured to open when an internal pressure of the unit cell 110 increases, e.g., to beyond a predetermined value.

The plug 118 may seal an electrolyte injection hole of the unit cell 110.

Figure 3A:
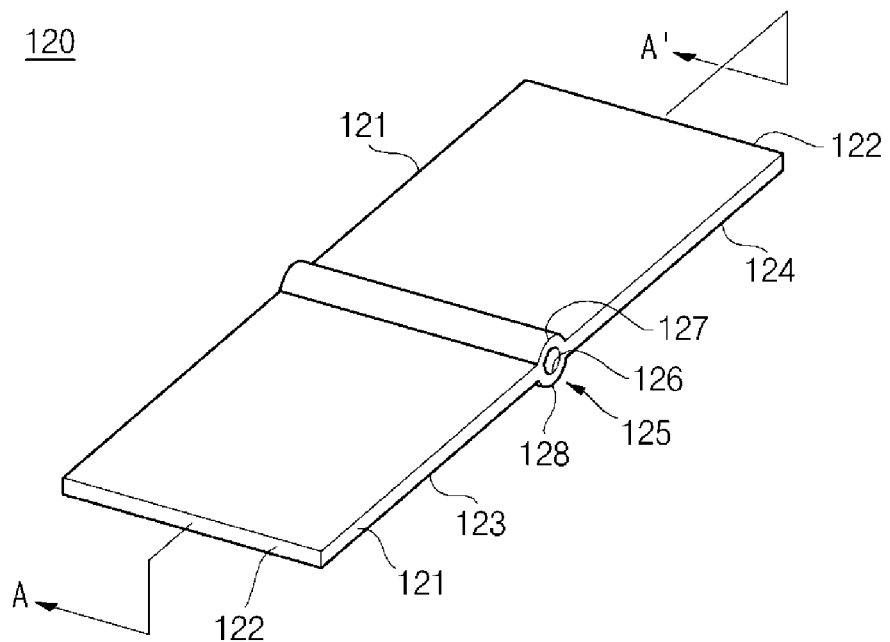
FIG. 3a illustrates a perspective view of a bus bar shown in FIG. 1.

Referring to FIG. 3a, the bus bar 120 may be shaped as, e.g., a plate having long sides 121 and short sides 122. The bus bar 120 may include a first welding surface 123 and a second welding surface 124, e.g., at a bottom surface and/or one or more edges thereof, to electrically connect two or more unit cells to each other.

In the example embodiment shown in FIG. 1, the bus bar 120 is disposed to cover the first electrode terminal 113 of the first unit cell 110 and the second electrode terminal 114 of the second unit cell 110-1 in a state in which the first electrode terminal 113 of the first unit cell 110 and the second electrode terminal 114 of the second unit cell 110-1 are alternately disposed. The first electrode terminal 113 of the first unit cell 110 may be fixed to the first welding surface 123 of the bus bar 120 by welding. The second electrode terminal 114 of the second unit cell 110-1 may be fixed to the second welding surface 124 of the bus bar 120 by welding.

In an implementation, the sensing member 130 may be directly connected to the bus bar 120 (e.g., by way of a press-fit connection to a hole or groove formed in the bus bar 120, as described in greater detail below), such that separate fastening components (e.g., a nut, a screw/nut assembly, a crimp fitting, etc.) may be omitted, thereby lowering the manufacturing cost and reducing the weight of a battery system that includes the secondary battery module. In addition, the sensing member 130 may connected to the bus bar 120 using a press-fit method to facilitate an assembly process, thereby improving working efficiency. Further, in the case that the bus bar 120 is welded to the terminals 113, 114 of the respective unit cells 110, the sensing member 130 may be connected to the bus bar 120 after the welding operation is completed.

Figure 3B:
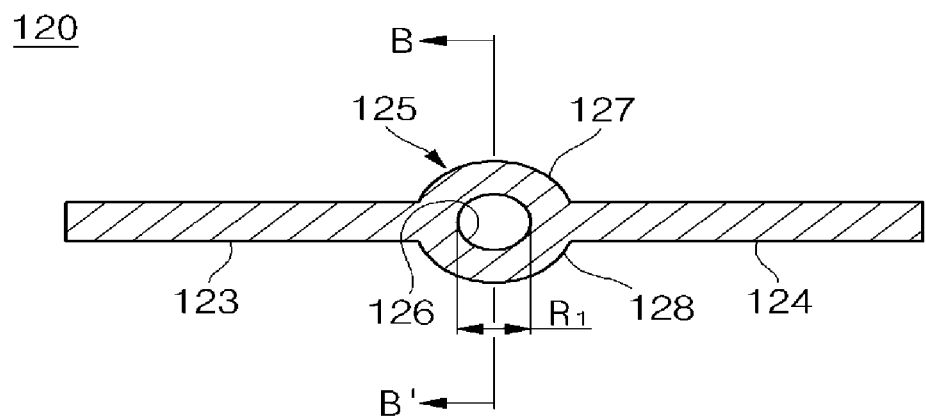

Referring to FIG. 3b, the bus bar 120 may include a coupling part 125 configured to connect to the sensing member 130. The coupling part 125 may have an insertion part 126 to allow the sensing member 130 to be inserted into the long side 121 of the bus bar 120. The sensing member 130 may be inserted into the coupling part 125 in a direction that is substantially perpendicular to one of the long sides of the bus bar 120. The coupling part 125 may be positioned between, or spaced apart from each of, the first welding surface 123 and the second welding surface 124. The bus bar 120 may be made of, e.g., aluminum.

Figure 4:
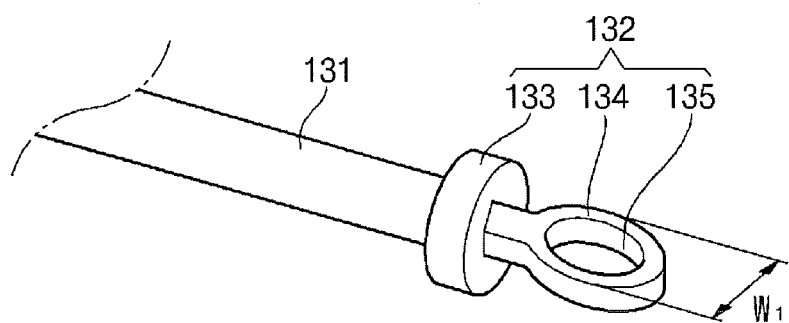
FIG. 4 illustrates a perspective view of a sensing member shown in FIG. 2.

Referring to FIG. 4, the sensing member 130 may include a cable 131, which may include a conductive wire surrounded by an insulating member. The sensing member 130 may include a detection part 132. The detection part 132 may include a connection part 133, an elastic fixing part 134, and a hole 135.

The detection part 132 may detect an attribute of the unit cell 110. For example, the detection part 132 may sense a voltage at the bus bar 120. The detection part 132 may be electrically connected to the bus bar 120 by the press-fit connection therebetween.

The cable 131 may transmit a signal to the controller 140. The signal may be, e.g., a voltage detected at the bus bar 120. A power system including the battery module 100 may use the detected voltage to adjust operation of the power system accordingly. In an implementation, the detection part 132 may include a sensor. For example, the detection part 132 may include a temperature sensor, such as a thermocouple, a resistance-temperature detector (RTD), etc., and a power system including the battery module 100 may use the temperature sensor to monitor temperature and adjust operation of the power system accordingly.

Referring again to FIG. 3b, a diameter R1 of the insertion part 126 of the bus bar 120 may be smaller than a width of the detection part 132 of the sensing member 130, such that the detection part 132 of the sensing member 130 may be fixed to the insertion part 126 in a press-fit manner, e.g., an interference fit. The detection part 132 may be inserted into the insertion part 126 and may have a press-fit with an inside wall of the insertion part 126. The detection part 132 may be removably connected to the insertion part 126, such that the detection part 132 may be detached and reconnected.

In the present example embodiment, the insertion part 126 of the bus bar 120 is a through hole extending from one long side 121 to the other long side 121 of the bus bar 120, i.e., extending in a direction of a short side 122 of the bus bar 120. The insertion part 126 may include a first reinforcement part 127 and a second reinforcement part 128. The first reinforcement part 127 and the second reinforcement part 128 may increase a thickness of the insertion part 126 outwardly, thereby reinforcing the strength of the bus bar 120.

In another implementation, the insertion part 126 may be a groove finished from one long side 121 to a portion toward the center of the bus bar 120. For example, a recess may be formed in the bus bar 120 across a width of the bus bar 120 to receive the detection part 132. The recess may be formed similar to the coupling part 125 with an open side.

Referring again to FIG. 4, the detection part 132 may be fixedly inserted into the insertion part 126 in a press-fit manner to maintain a state in which the periphery of the insertion part 126 and a portion of the detection part 132 make contact with each other. The detection part 132 may detect electrical properties (e.g., voltage) of the unit cell 110 at the bus bar 120.

The connection part 133 may connect the cable 131 to the elastic fixing part 134. The connection part 133 may be integrally formed with the elastic fixing part 134. A width of the connection part 133 may be equal to a diameter R1 of the insertion part 126. In an implementation, the width of the connection part 133 may be greater than the diameter R1 of the insertion part 126. In an implementation, the connection part 133 may be inserted into the insertion part 126 in a press-fit manner according to an insertion space of the insertion part 126.

The elastic fixing part 134 of the detection part 132 may be configured to be pressed from an undeformed state to a pressed state and inserted into the insertion part 126. The elastic fixing part 134 may have a width in the undeformed state that is larger than the diameter R1 of the insertion part 126. The elastic fixing part 134 may have a centrally formed hole 135.

The elastic fixing part 134 may have a shape of an ellipse. In an implementation, the hole 135 may have the same elliptical shape as that of the elastic fixing part 134. A longer diameter of the ellipse of the elastic fixing part 134 may be positioned on an imaginary line extending from the cable 131, with a shorter diameter of the ellipse of the elastic fixing part 134 corresponding to a width W1 of the elastic fixing part 134. In the sensing member 130, the elastic fixing part 134 and the wire may be made of, e.g., a conductive material such as copper or another metal.

Figure 5A:
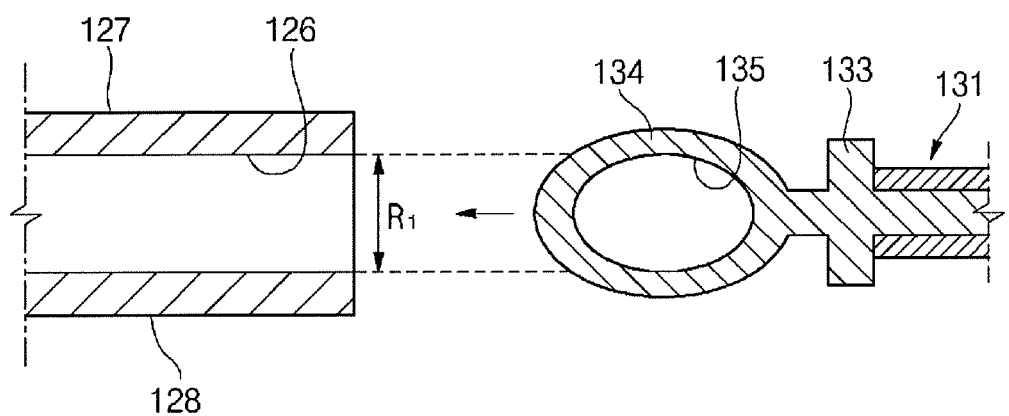
FIGS. 5a and 5b illustrate cross-sectional views where a sensing member is coupled to a bus bar, taken along the line B-B' of FIG. 3b.
Figure 5B:
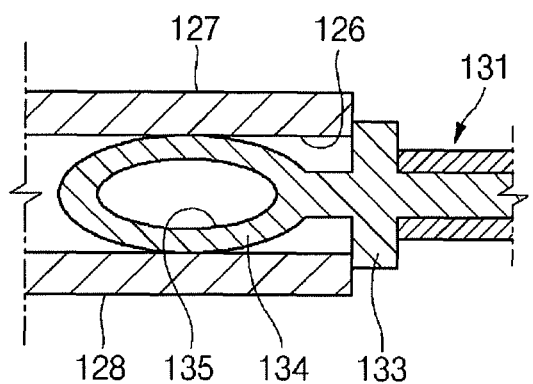

Referring to FIGS. 5a and 5b, the elastic fixing part 134 may be fixedly inserted into the insertion part 126 in a press-fit manner. The width W1 of the elastic fixing part 134 may be greater than the diameter R1 of the insertion part 126. In an implementation, the diameter R1 of the insertion part 126 may correspond to the shorter diameter or interior diameter of the hole 135. When the elastic fixing part 134 is inserted into the insertion part 126 in the press-fit manner, the width W1 of the elastic fixing part 134 may be pressed by the diameter R1 of the insertion part 126.

As described above, the elastic fixing part 134 may be pressed and fixed to the insertion part 126 in the press-fit manner. Thus, an assembling process of the secondary battery module 100 may be facilitated, thereby improving working efficiency. In addition, the secondary battery module 100 according to the present example embodiment may reduce the number of components required for fastening. Thus, the manufacturing cost may be lowered and the weight of the secondary battery module 100 may be reduced.

Figure 6:
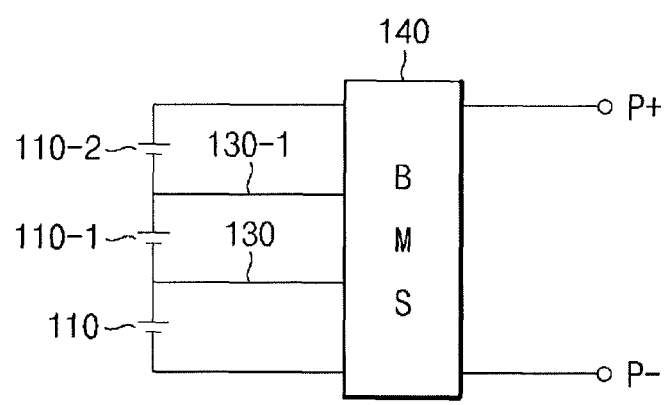
FIG. 6 illustrates a circuit view of a unit cell shown in FIG. 1.

Referring to FIG. 6, the controller 140 may be connected to the sensing member 130 fixed to the bus bar 120. The sensing member 130 may be electrically connected to the bus bar 120, and the controller 140 may be electrically connected to the sensing member to receive a signal, e.g., a voltage signal, from the bus bar 120. In a battery system that includes the secondary battery module 100, the controller 140 may control the secondary battery module 100 based on a signal of the unit cell 110 sensed by the sensing member 130. The controller 140 may be formed by a battery management system (BMS) including one or more of, e.g., a voltage detection circuit, a temperature detection circuit, and a control circuit. The controller 140 may control one or more of a charging state of the second battery module 100, a discharging state of the secondary battery module 100, a cooling state of the secondary battery module 100, etc. For example, the controller 140 may commence or terminate charging or discharging, or change a rate thereof, or commence or terminate cooling, etc.

A bus bar 220 according to another example embodiment will now be described.

Figure 7A:
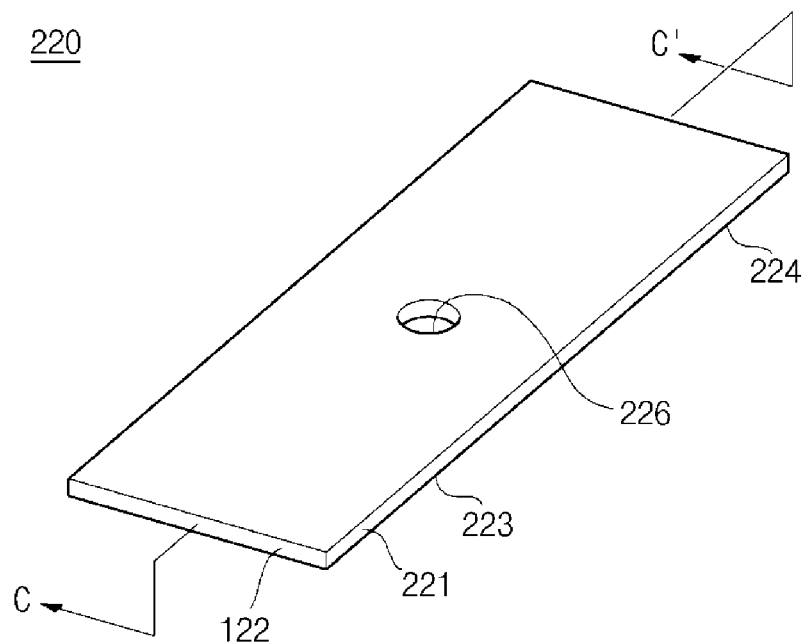
Figure 7B:
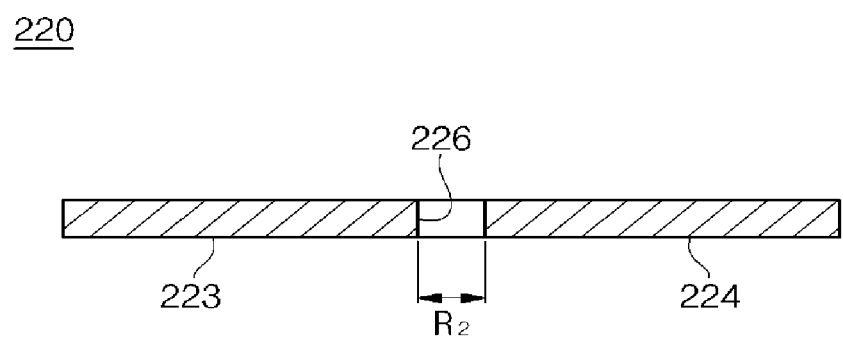
Figure 8A:
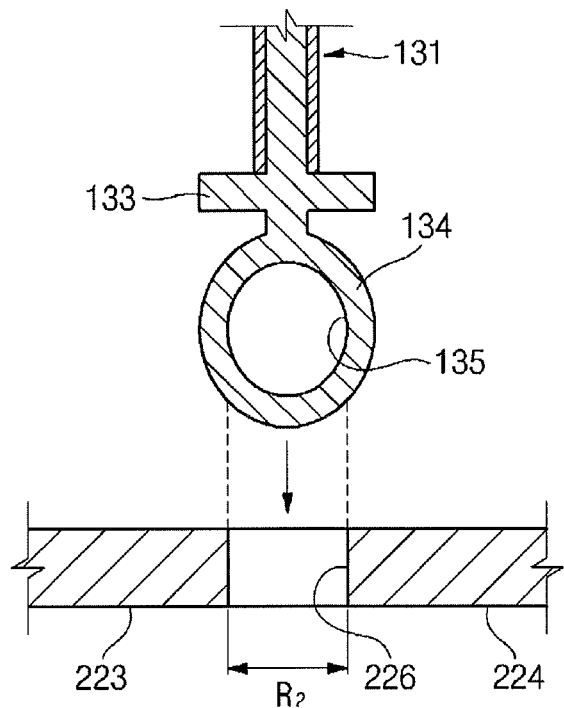
Figure 8B:
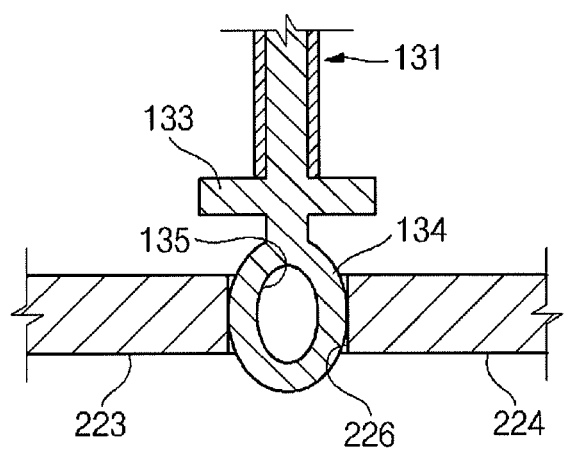

FIG. 7a illustrates a perspective view of another example embodiment of the bus bar shown in FIG. 3a, FIG. 7b illustrates a cross-sectional view, taken along the line C-C' of FIG. 7a, and FIGS. 8a and 8b illustrate cross-sectional views where a sensing member is coupled to a bus bar, taken along the line C-C' of FIG. 7a.

In the example embodiment shown in FIG. 7a, the bus bar 220 has an insertion part 226 formed in a plate (e.g., at the center thereof) having long sides 221 and short sides 222. The following description will focus on the insertion part 226; parts of the bus bar 220 may be the same as, or similar to, those of the bus bar 120 shown in FIGS. 3a and 3b, and details thereof may not be repeated.

The insertion part 226 may be a through hole penetrating the bus bar 220. In an implementation, the insertion part 226 may be shaped as a groove having a length that is less than a thickness of the bus bar 220 (e.g., a blind hole), such as in a case where the bus bar 220 is thick. The sensing member 130 may include the elastic fixing part 134 and may have the hole 135 in the elastic fixing part 134. A diameter R2 of the insertion part 226 may be smaller than a width W1 of the elastic fixing part 134.

Referring to FIGS. 8a and 8b, the elastic fixing part 134 may be fixedly inserted into the insertion part 226 in a press-fit manner. The width W1 of the elastic fixing part 134 may be greater than the diameter R2 of the insertion part 226. In this case, the diameter R2 of the insertion part 226 may correspond to a diameter of the hole 135. When the elastic fixing part 134 is fixedly inserted into the insertion part 226 in the press-fit manner, the width W1 of the elastic fixing part 134 may be pressed by the diameter R2 of the insertion part 226.

The elastic fixing part 134 may be pressed and fixed to the insertion part 226 in the press-fit manner. Thus, an assembling process of the secondary battery module 100 may be facilitated, thereby improving working efficiency. In addition, the secondary battery module 100 according to the present example embodiment may reduce the number of components required for fastening. Thus, the manufacturing cost may be lowered and the weight of the secondary battery module 100 may be reduced.

A bus bar 320 according to still another example embodiment will now be described.

Figure 9A:
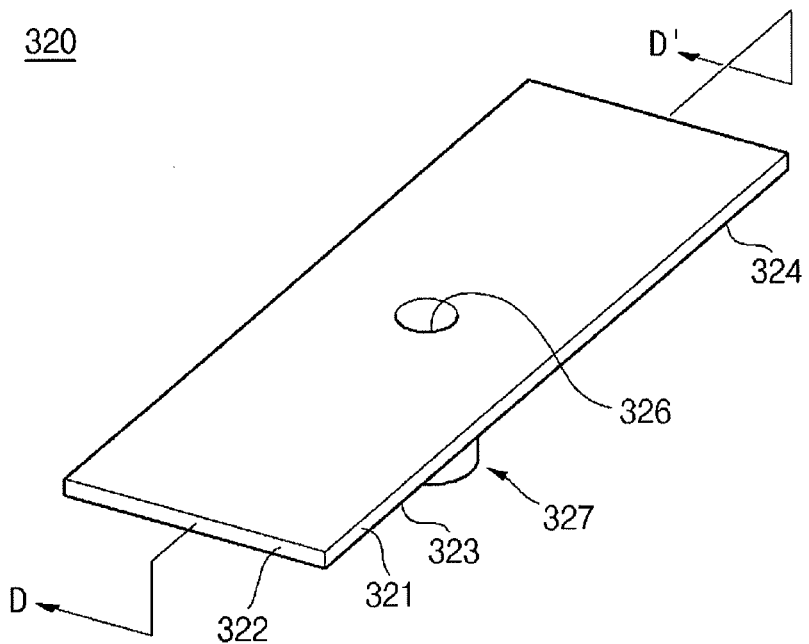
Figure 9B:
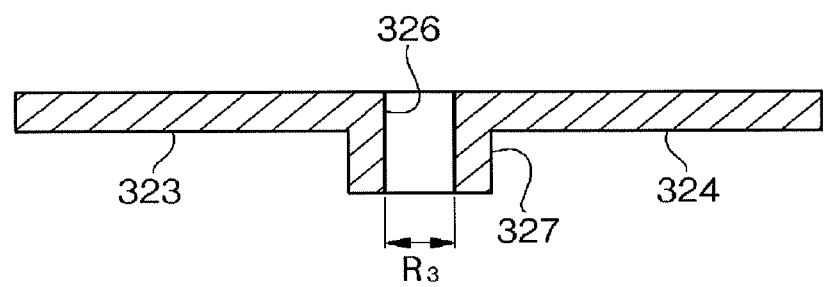
Figure 10A:
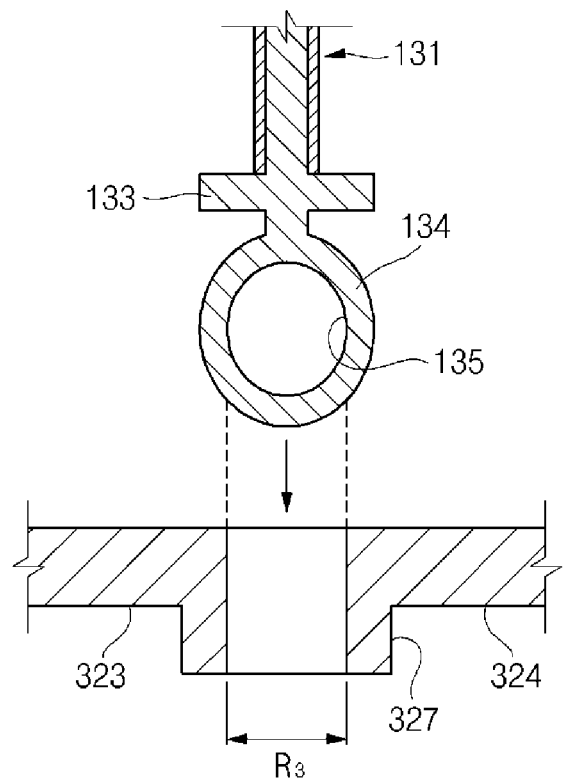
Figure 10B:
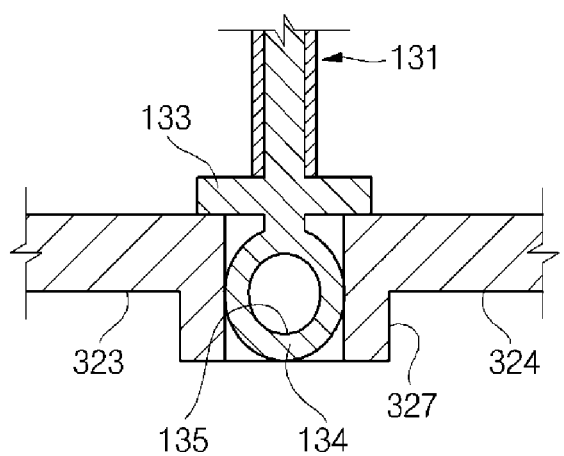

FIG. 9a illustrates a perspective view of still another example of the bus bar shown in FIG. 3a, FIG. 9b illustrates a cross-sectional view, taken along the line D-D' of FIG. 9a, and FIGS. 10a and 10b illustrate cross-sectional views where a sensing member is coupled to a bus bar, taken along the line D-D' of FIG. 9a.

In the example embodiment shown in FIG. 9a, the bus bar 320 has an insertion part 326 formed in a plate (e.g., at a center thereof) having long sides 321 and short sides 322. The following description will focus on the insertion part 326; parts of the bus bar 320 may be the same as, or similar to, those of the bus bar 120 shown in FIGS. 3a and 3b, and details thereof may not be repeated.

The insertion part 326 may have a corresponding extension part 327. For example, a boss may be provided on a side of the bus bar 320, the boss being aligned with the insertion part 326 and disposed on a side of the bus bar 320 that is opposite an insertion side into which the elastic fixing part 134 is inserted. The extension part 327 may extend a length of a through hole or groove of the insertion part 326. The extension part 327 may be formed in a space ranging from a lower side of the bus bar 320 to an upper side of the cap plate 112 of the unit cell 110.

The insertion part 326 may be a through hole penetrating the extension part 327. In another implementation, the extension part 327 may be formed with an internally finished groove. A diameter R3 of the insertion part 326 may be smaller than a width W1 of the elastic fixing part 134.

Referring to FIGS. 10a and 10b, the elastic fixing part 134 may be fixedly inserted into the insertion part 326 in a press-fit manner. The width W1 of the elastic fixing part 134 may be greater than the diameter R3 of the insertion part 326. The diameter R3 of the insertion part 326 may correspond to an inner diameter of the hole 135. When the elastic fixing part 134 is fixedly inserted into the insertion part 326 in the press-fit manner, the width W1 of the elastic fixing part 134 may be pressed by the diameter R3 of the insertion part 326.

The elastic fixing part 134 may be pressed and fixed to the insertion part 326 in the press-fit manner. Thus, an assembling process of the secondary battery module 100 may be facilitated, thereby improving working efficiency. In addition, the secondary battery module 100 according to the present example embodiment may reduce the number of components required for fastening. Thus, the manufacturing cost may be lowered and the weight of the secondary battery module 100 may be reduced.

A sensing member 230 according to another example embodiment will now be described.

Figure 11:
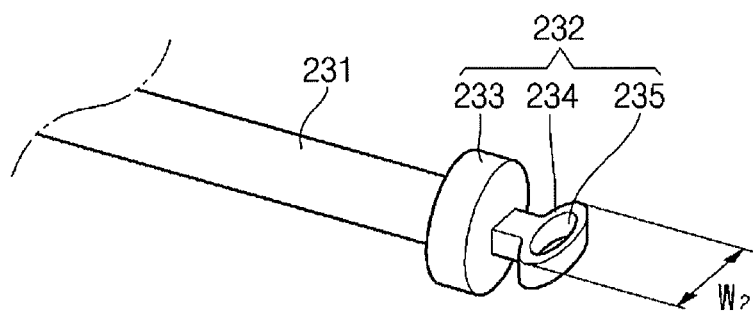
FIG. 11 illustrates a perspective view of another example embodiment of the sensing member shown in FIG. 4.

FIG. 11 illustrates a perspective view of another example embodiment of the sensing member shown in FIG. 4.

In the present example embodiment, a sensing member 230 has a detection part 232 shaped as an ellipse, where a longer diameter of the ellipse of the detection part 232 corresponds to a width W2 of the detection part 232. The following description will focus on the detection part 232; parts of the sensing member 230 may be the same as, or similar to, those of the sensing member 130 shown in FIG. 4, and details thereof may not be repeated.

The detection part 232 may include a connection part 233, an elastic fixing part 234, and a hole 235. The detection part 232 may be fixedly inserted into the insertion part 126 in a press-fit manner.

In the present example embodiment, a shorter diameter of the elastic fixing part 234 is positioned on an imaginary line extending from a cable 231, and a longer diameter of the elastic fixing part 234 corresponds to a width W2 of the elastic fixing part 234. The hole 235 may have the same elliptical shape as that of the elastic fixing part 234. The width W2 of the elastic fixing part 234 may be greater than a diameter R1 of the insertion part 126. In another example embodiment, the elastic fixing part 234 may be shaped of a circle having orthogonal diameters that are equal to each other.

An external surface of the elastic fixing part 234 may be fixedly inserted into the insertion part 126 in a press-fit manner. The elastic fixing part 234 may be pressed and fixed to the insertion part 126 in the press-fit manner. Thus, an assembling process of the secondary battery module 100 may be facilitated, thereby improving working efficiency. In addition, a reduced number of components may be required for fastening. Thus, the manufacturing cost may be lowered and the weight of the secondary battery module 100 may be reduced.

A sensing member 330 according to still another example embodiment will now be described.

Figure 12:
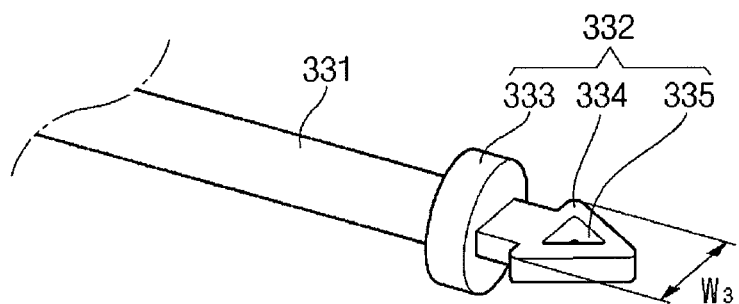
FIG. 12 illustrates a perspective view of still another example embodiment of the sensing member shown in FIG. 4.

FIG. 12 illustrates a perspective view of still another example embodiment of the sensing member shown in FIG. 4.

As shown in FIG. 12, the sensing member 330 may have a detection part 332 shaped as a triangle. The following description will focus on the detection part 332; parts of the sensing member 330 may be the same as, or similar to, those of the sensing member 130 shown in FIG. 4, and details thereof may not be repeated. In the present example embodiment, the detection part 332 may have a polygonal shape, e.g., a triangle.

The detection part 332 may include a connection part 333, an elastic fixing part 334, and a hole 335. The detection part 332 may be fixedly inserted into the insertion part 126 in a press-fit manner.

One leg of the triangle of the elastic fixing part 334 may correspond to a width W3 of the elastic fixing part 334. The width W3 of the elastic fixing part 334 may be greater than a diameter R1 of the insertion part 126. In this case, the hole 335 may have the same triangular shape as that of the elastic fixing part 334. An external surface of the elastic fixing part 334 may be fixedly inserted into the insertion part 126 in a press-fit manner.

The elastic fixing part 334 may be pressed and fixed to the insertion part 126 in the press-fit manner. Thus, an assembling process of the secondary battery module 100 may be facilitated, thereby improving working efficiency. In addition, a reduced number of components may be required for fastening. Thus, the manufacturing cost may be lowered and the weight of the secondary battery module 100 may be reduced.

Figure 13A:
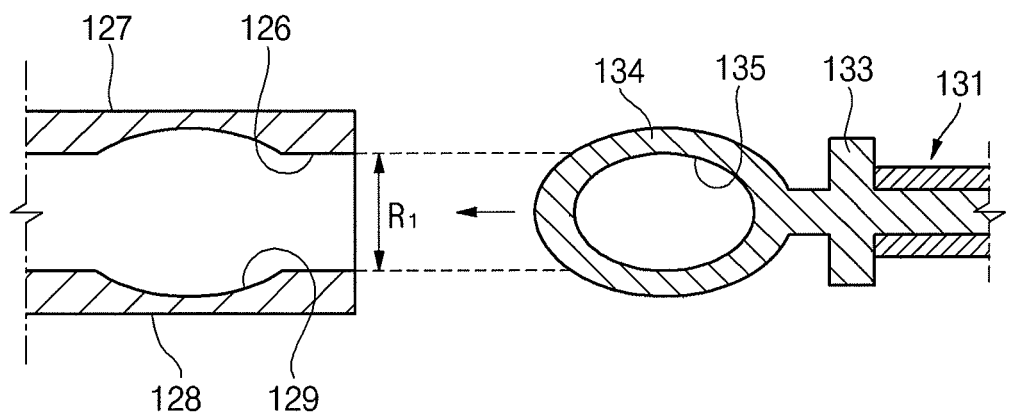
FIGS. 13a and 13b illustrate cross-sectional views where a sensing member is coupled to a bus bar according to another example embodiment.
Figure 13B:
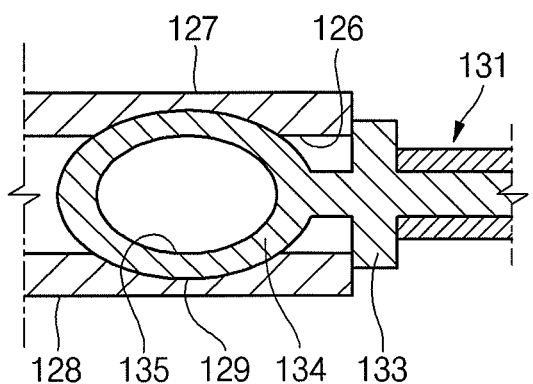

FIGS. 13a and 13b illustrate cross-sectional views where a sensing member is coupled to a bus bar according to another embodiment.

In the example embodiment shown in FIGS. 13a and 13b, the insertion part 126 includes a recess 129 configured to receive the detection part 132. The recess 129 and elastic fixing part 134 may serve as a detent to register and firmly couple the detection part 132 to the bus bar 120.

As described above, embodiments may provide a secondary battery module having provisions for detecting a property, e.g., an electrical property, of a cell. A sensing member may be directly connected to a bus bar having a hole or groove formed therein to detect electrical properties of a unit cell, which may improve the safety of the battery. In addition, the sensing member may be directly connected to the bus bar having a hole or groove formed therein. Thus, the number of components required for fastening may be reduced, thereby lowering the manufacturing cost and reducing the weight of the secondary battery module. In addition, the sensing member may be connected to the bus bar using a press-fit method to facilitate an assembling process of the secondary battery module, thereby improving working efficiency.

DESCRIPTION OF REFERENCE NUMERALS

| | |
|---|---|
| 100: Secondary battery module | |
| 110, 110-1, 110-2: Unit cell | |
| 111: Case | 112: Cap plate |
| 113: First electrode terminal | 14: Second electrode terminal |
| 117: Safety vent | 18: Plug |
| 120: Bus bar | 125: Coupling part |
| 130, 130-1: Sensing member | 140: Controller |

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
a plurality of unit cells, each unit cell having a first terminal and a second terminal, the plurality of unit cells including at least a first unit cell and a second unit cell; and
a bus bar electrically connecting the first terminal of the first unit cell to one of the first and second terminals of the second unit cell, the bus bar including an insertion part therein, the insertion part being configured to receive a sensing member and connect the sensing member to the bus bar,
wherein:
the sensing member is disposed in the insertion part and is connected to the bus bar, the sensing member being connected to the bus bar by a press-fit connection,
the sensing member includes an elastic detection part configured to be pressed from an undeformed state to a pressed state when inserted into the insertion part, and
the detection part is shaped as an elliptical, circular, or polygonal ring having a width in the undeformed state that is larger than a width of the insertion part.

2. The battery module as claimed in claim 1, wherein the insertion part is a groove or through hole.

3. The battery module as claimed in claim 1, wherein:
the bus bar has long sides extending between the first terminal of the first unit cell and the one of the first and second terminals of the second unit cell, and
the insertion part is a groove or through hole extending between the long sides.

4. The battery module as claimed in claim 1, wherein:
the bus bar is fixed to the first terminal of the first unit cell and fixed to the one of the first and second terminals of the second unit cell, the bus bar having respective fixing areas where the bus bar is fixed to first terminal of the first unit cell and fixed to the one of the first and second terminals of the second unit cell, and
the insertion part is spaced apart from each of the respective fixing areas.

5. The battery module as claimed in claim 1, wherein the press-fit connection provides an electrical connection between the sensing member and the bus bar.

6. The battery module as claimed in claim 1, wherein the detection part is inserted into the insertion part and press-fit with an inside wall of the insertion part.

7. The battery module as claimed in claim 6, wherein the insertion part includes a recess in the inside wall thereof, the recess being configured to receive the detection part.

8. The battery module as claimed in claim 1, wherein the sensing member includes a detection part that is shaped as an ellipse, a long dimension of the ellipse being greater than a width of the insertion part, the long dimension of the ellipse being pressed by walls of the insertion part when the detection part is inserted in the insertion part.

9. The battery module as claimed in claim 1, wherein the sensing member includes a detection part that is shaped as an ellipse, a short dimension of the ellipse being greater than a width of the insertion part, the short dimension of the ellipse being pressed by walls of the insertion part when the detection part is inserted in the insertion part.

10. The battery module as claimed in claim 1, wherein the sensing member includes a detection part that is shaped as a triangle, a leg of the triangle having a length that is greater than a width of the insertion part, the leg of the triangle being pressed by walls of the insertion part when the detection part is inserted in the insertion part.

11. The battery module as claimed in claim 1, wherein:
the bus bar has long sides extending between the first terminal of the first unit cell and the one of the first and second terminals of the second unit cell,
the insertion part is a groove or through hole extending between the long sides, and
an insertion direction of the sensing member is substantially perpendicular to one of the long sides.

12. The battery module as claimed in claim 1, wherein:
the bus bar has long sides extending between the first terminal of the first unit cell and the one of the first and second terminals of the second unit cell, opposing upper and lower major surfaces of the bus bar extending between the long sides, and
the insertion part is a through hole penetrating the upper and lower major surfaces of the bus bar.

13. The battery module as claimed in claim 1, wherein:
the bus bar has long sides extending between the first terminal of the first unit cell and the one of the first and second terminals of the second unit cell, opposing upper and lower major surfaces of the bus bar extending between the long sides, the insertion part penetrates the upper major surface of the bus bar, the sensing member being inserted into the insertion part where the insertion part penetrates the upper major surface, and the bus bar includes an extension part at the lower major surface, the extension part being aligned with the insertion part.

14. The battery module as claimed in claim 1, further comprising a battery management system configured to monitor a state of the battery module, the battery management system receiving a signal from the sensing member.

15. The battery module as claimed in claim 1, wherein the sensing member is removably coupled to the bus bar.

16. A battery module, comprising:

a plurality of unit cells, each unit cell having a first terminal and a second terminal, the plurality of unit cells including at least a first unit cell and a second unit cell; and a bus bar electrically connecting the first terminal of the first unit cell to one of the first and second terminals of the second unit cell, the bus bar including an insertion part therein, the insertion part being configured to receive a sensing member and connect the sensing member to the bus bar, wherein:

the sensing member includes a detection part that is shaped as an ellipse, a long dimension of the ellipse being greater than a width of the insertion part, the long dimension of the ellipse being pressed by walls of the insertion part when the detection part is inserted in the insertion part;

the sensing member includes a detection part that is shaped as an ellipse, a short dimension of the ellipse being greater than a width of the insertion part, the short dimension of the ellipse being pressed by walls of the insertion part when the detection part is inserted in the insertion part; or the sensing member includes a detection part that is shaped as a triangle, a leg of the triangle having a length that is greater than a width of the insertion part, the leg of the triangle being pressed by walls of the insertion part when the detection part is inserted in the insertion part.

* * * * *